United States Patent
Kuiper et al.

(10) Patent No.: US 8,132,170 B2
(45) Date of Patent: *Mar. 6, 2012

(54) CALL STACK SAMPLING IN A DATA PROCESSING SYSTEM

(75) Inventors: Kean G. Kuiper, Round Rock, TX (US);
Frank Eliot Levine, Austin, TX (US);
Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1244 days.

This patent is subject to a terminal disclaimer.

(21) Appl. No.: 11/834,779

(22) Filed: Aug. 7, 2007

(65) Prior Publication Data

US 2009/0044198 A1 Feb. 12, 2009

(51) Int. Cl.
*G06F 9/455* (2006.01)
*G06F 9/44* (2006.01)

(52) U.S. Cl. ........................ 718/100; 717/127
(58) Field of Classification Search ................. 719/310, 719/318; 718/100, 107; 717/126, 127
See application file for complete search history.

(56) References Cited

U.S. PATENT DOCUMENTS

| | | | | |
|---|---|---|---|---|
| 5,379,432 A * | 1/1995 | Orton et al. | | 719/315 |
| 5,404,529 A * | 4/1995 | Chernikoff et al. | | 719/315 |
| 5,473,777 A * | 12/1995 | Moeller et al. | | 719/328 |
| 5,475,845 A * | 12/1995 | Orton et al. | | 719/328 |
| 5,764,241 A * | 6/1998 | Elliott et al. | | 345/473 |
| 6,651,243 B1 * | 11/2003 | Berry et al. | | 717/130 |
| 6,728,955 B1 * | 4/2004 | Berry et al. | | 717/158 |
| 6,728,959 B1 * | 4/2004 | Merkey | | 718/102 |
| 6,751,789 B1 * | 6/2004 | Berry et al. | | 717/130 |
| 7,321,965 B2 * | 1/2008 | Kissell | | 712/229 |
| 7,779,238 B2 * | 8/2010 | Kosche et al. | | 712/227 |
| 2006/0072563 A1 * | 4/2006 | Regnier et al. | | 370/389 |
| 2008/0148240 A1 * | 6/2008 | Jones et al. | | 717/130 |

* cited by examiner

*Primary Examiner* — Van Nguyen
(74) *Attorney, Agent, or Firm* — Yee & Associates, P.C.; David A. Mims, Jr.

(57) ABSTRACT

A computer implemented method, apparatus, and computer usable program code for sampling call stack information. An event is monitored during execution of a plurality of threads executed by a plurality of processors. In response to an occurrence of the event, a thread is identified in the plurality of threads to form an identified thread. A plurality of sampling threads is woken, wherein a sampling thread within the plurality of sampling threads is associated with each processor in the plurality of processors and wherein one sampling thread in the plurality of sampling threads obtains call stack information for the identified thread.

21 Claims, 5 Drawing Sheets

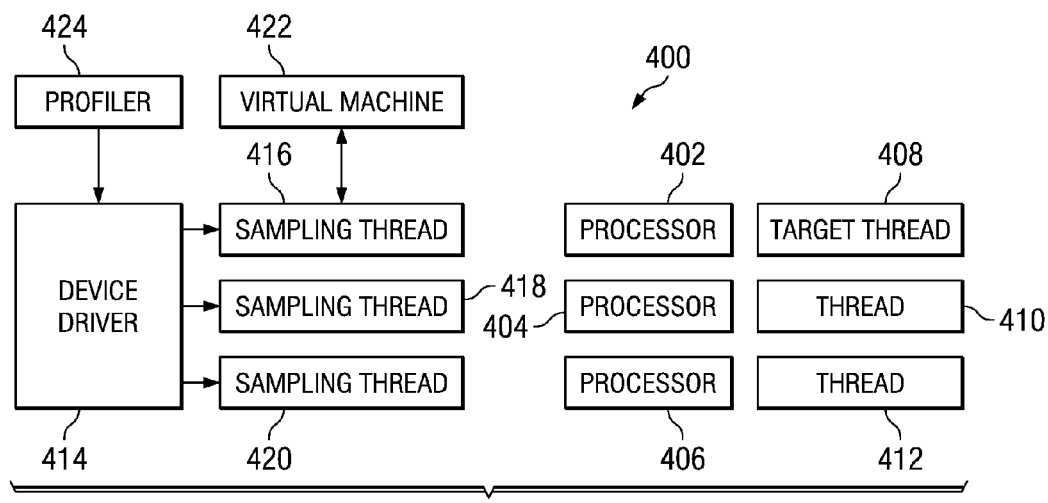
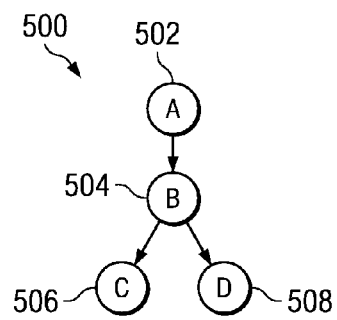
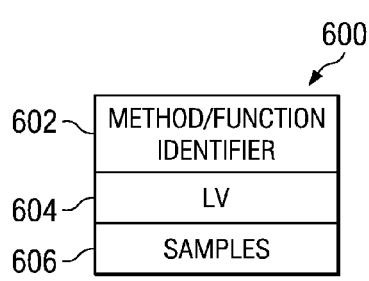
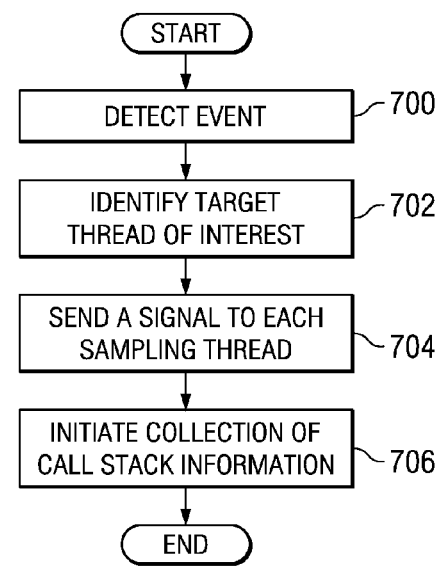

CALL STACK SAMPLING IN A DATA PROCESSING SYSTEM

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for call stack sampling in a data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may be used using various techniques to provide information, such as execution flows as well as other aspects of an executing program. A trace may contain data about the execution of code. For example, a trace may contain trace records about events generated during the execution of the code. A trace also may include information, such as, a process identifier, a thread identifier, and a program counter. Information in the trace may vary depending on the particular profile or analysis that is to be performed. A record is a unit of information relating to an event that is detected during the execution of the code.

Attempting to obtain an unbiased time based sample call stack from a virtual machine, such as a Java™ virtual machine, on an operating system may be a difficult task. Java™ is a trademark of Sun Microsystems, Inc. Many approaches are presently used for obtaining call stack information. These approaches include obtaining an application timer tick or instrumenting code and sampling the instrumented values. These types of techniques, however, in a symmetric multi-processor (SMP) system have a drawback of requiring additional instrumentation in the code or possibly allowing the thread whose call stack is to be sampled to migrate to a different processor during the sampling process.

More specifically, in time profiling, a timer interrupt may cause a process to obtain an instruction address for a thread that is being executed at the time of the interrupt. With environments such as Java™ or other object oriented environments, an ability is present to obtain call stack information that includes the internal state of the virtual machine. The call stack may be requested from a virtual machine to obtain information for analysis. One problem that occurs with this type of process is that when the call stack is requested, the thread that has been interrupted may migrate to a different processor. Migration of the thread from one processor to another processor may result in reports that are biased. On a symmetric multiprocessor (SMP) system, it is advantageous to obtain samples from each processor in order to collect information about the state of the machine on all processors. Sampling threads may be bound to each processor as part of a profiling algorithm implemented by a profiler. For example, if an interrupt is generated on processor 1, interrupting thread 1, and an attempt to obtain the call stack on thread 1 causes the thread 1 to migrate to processor 2, then an interrupt on processor 2 may also interrupt thread 1. This type of migration may cause samples for thread 1 to be counted more often than desired, which is referred to as overcounting.

Thus, it would be advantageous to have an improved computer implemented method, apparatus, and computer usable program code for obtaining call stack information on a multiprocessor system.

SUMMARY OF THE INVENTION

The illustrative embodiments provide a computer implemented method, apparatus, and computer usable program code for sampling call stack information. An event is monitored during execution of a plurality of threads executed by a plurality of processors. In response to an occurrence of the event, a thread is identified in the plurality of threads to form an identified thread. A plurality of sampling threads is woken, wherein a sampling thread within the plurality of sampling threads is associated with each processor in the plurality of processors and wherein one sampling thread in the plurality of sampling threads obtains call stack information for the identified thread.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating components used in obtaining call stack information in accordance with an illustrative embodiment;

FIG. 5 is a diagram of a tree in accordance with an illustrative embodiment;

FIG. 6 is a diagram illustrating information in a node in accordance with an illustrative embodiment;

FIG. 7 is a flowchart of a process for obtaining call stack information for a target thread in accordance with an illustrative embodiment;

DETAILED DESCRIPTION OF THE PREFERRED EMBODIMENT

Figure 1:
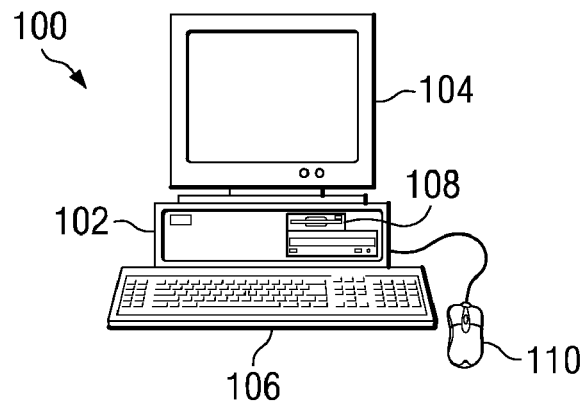
FIG. 1 is a pictorial representation of a data processing system in which illustrative embodiments may be implemented.

With reference now to the figures, and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices could include, for example, a joystick, a touchpad, a touch screen, a trackball, and a microphone.

Computer 100 may be any suitable computer, such as an IBM® eServer™ computer, or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
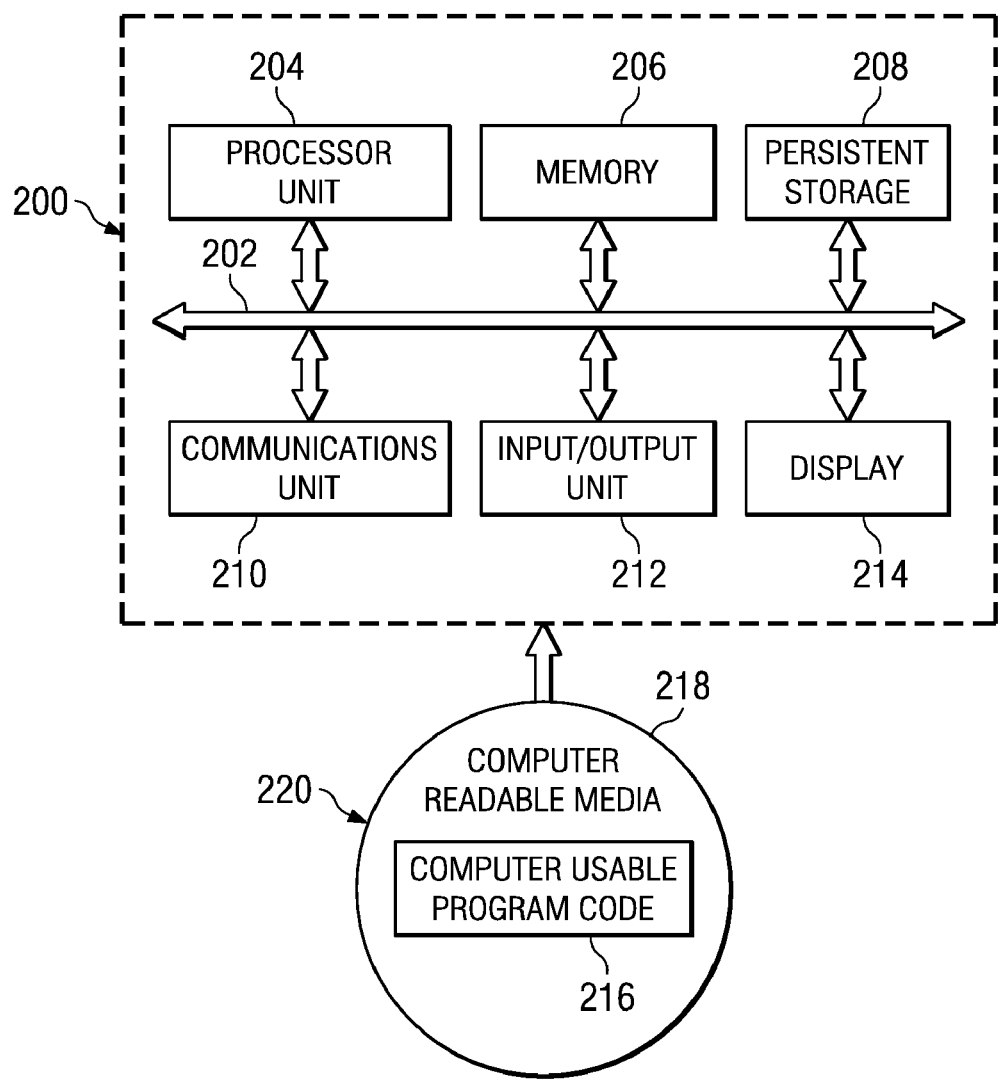
FIG. 2 is a diagram of a data processing system in accordance with an illustrative embodiment.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multiprocessor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as computer usable program code or computer readable program code that may be read and executed by a processor in processor unit 204.

The computer readable program code may be embodied on different physical or tangible computer readable media, such as memory 206 or persistent storage 208.

Computer usable program code 216 is located in a functional form on computer readable media 218 and may be loaded onto, or transferred to, data processing system 200. Computer usable program code 216 and computer readable media 218 form computer program product 220 in these examples. In one example, computer readable media 218 may be, for example, an optical or magnetic disc that is inserted or placed into a drive or other device that is part of persistent storage 208 for transfer onto a storage device, such as a hard drive that is part of persistent storage 208. Computer readable media 218 also may take the form of a persistent storage, such as a hard drive or a flash memory that is connected to data processing system 200.

Alternatively, computer usable program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also make take the form of non-tangible media, such as communications links or wireless transmission containing the computer readable program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

The different illustrative embodiments recognize that in sampling call stack information for a thread of interest on a multi-processor system, such as a symmetric multi-processor system, the thread of interest may migrate or move to a different processor when a request for call stack information is issued. This movement of a thread may result in an over counting of a thread of interest because the thread has moved to a different processor. The different illustrative embodiments recognize that this type of thread migration or movement is undesirable because this situation results in a biased sample that is not accurate.

Thus, the different illustrative embodiments provide a computer implemented method, apparatus, and computer usable program code for sampling call stack information. An event is monitored for during an execution of a plurality of threads executed on a plurality of processors. In response to an occurrence of an event, a thread is identified from the plurality of threads to form an identified thread. The sampling threads are then signaled. Thereafter, the collection of call stack information for the interrupted thread is initiated. In these examples, a sampling thread is associated with each processor in the plurality of processors. Only one of the sampling threads is provided with work or a request to collect call stack information in these examples. The other sampling threads are left in an active or running state such that all of the processors remain busy and do not enter and exit an idle state. By keeping the processors busy, the thread of interest for which call stack information is desired is unable to migrate to another processor.

Thus, the different illustrative embodiments do not allow the thread to migrate or at least minimizes the probability of the thread of interest migrating when call stack information is collected. In this manner, an unbiased sample may be obtained.

Figure 3:
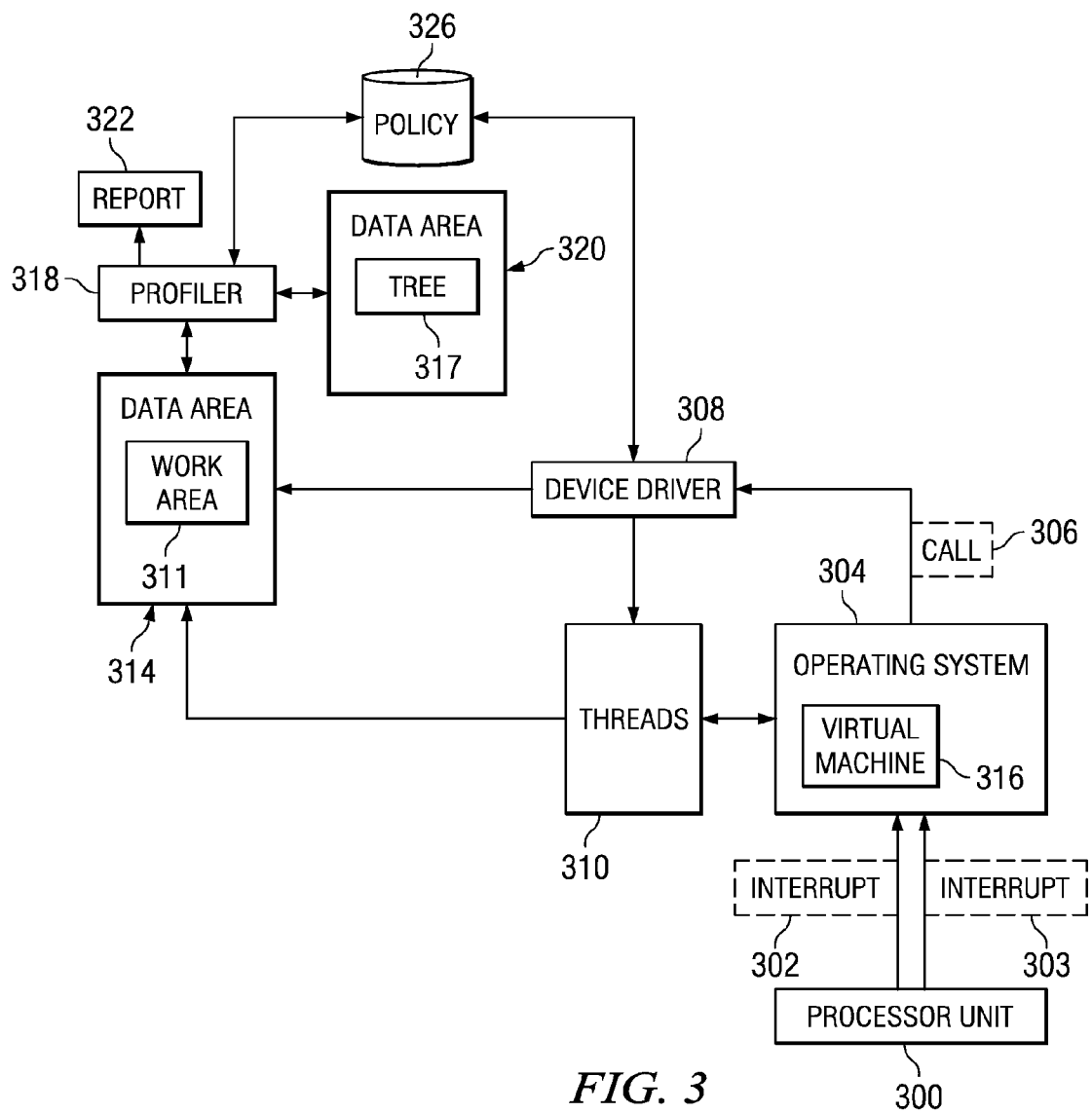
FIG. 3 is a diagram illustrating components used to identify states during processing in accordance with an illustrative embodiment.

Turning now to FIG. 3, a diagram illustrating components used to identify states during processing is depicted in accordance with an illustrative embodiment. In this depicted example, the components are examples of hardware and software components found in a data processing system, such as data processing system 200 in FIG. 2.

Processor unit 300 generates interrupt 302, which may result in call 306. Another processor in processor unit 300 may generate interrupt 303, which may also result in call 306. Call 306 is identified and processed by device driver 308. In these examples, call 306 is generated by the operating system 304. Various mechanisms exist to allow operating system 304 to generate call 306. Examples include registering a handler with operating system 304 to be notified when interrupts 302 and/or 303 occur, or having device driver 308 hook (directly handle) interrupt vectors so it gets control when either interrupt 302 or 303 occurs.

When device driver 308 receives call 306 and determines that a sample should be taken, device driver 308 places information, such as the thread ID of the thread whose call stack is to be sampled, in work area 311 for the chosen sampling thread and sends a signal to a sampling thread within threads 310 to collect call stack information for one or more threads of interest within threads 310. In these examples, the thread of interest is the thread that was interrupted. In the illustrative example, device driver 308 sends a signal to sampling threads within threads 310. Each of the sampling threads check work area 311 within data area 314 to determine what work the sampling thread should perform. In these examples, work area 311 may identify the work to obtain call stack information for the interrupted thread.

In these examples, a sampling thread within threads 310 performs the work to collect call stack information from virtual machine 316. In the depicted example, virtual machine 316 is a Java™ virtual machine. The collection of call stack information may be performed with respect to other virtual machines or other applications not in a virtual machine, depending on the particular implementation.

Profiler 318 is an application that is sample based in these examples. The selected sampling thread in profiler 318 uses the information placed in work area 311 to determine the thread whose call stack is to be obtained.

The call stack information for the thread is obtained and processed to create tree 317. In one embodiment, tree 317 is created in data area 320, which is allocated and maintained by profiler 318. Tree 317 contains call stack information and may also include additional information about the leaf node, which at the time of the sample is the current routine being executed.

In these examples none of the processors in processor unit 300 are idle because sampling threads are signaled and activated for all of the processors in processor unit 300. The interrupted processor is selected to generate the information.

In these illustrative examples, profiler 318 may send a process identifier to device driver 308 to identify a particular process that is to be monitored. When call 306 is received as a result of an interrupt, device driver 308 may initiate collection of call stack information for one or more threads within threads 310 by signaling the associated sampling thread that is bound to the interrupted processor that was created by profiler 318.

In the case of an interrupt in these illustrative examples, the interrupt handler may make a determination that a thread of interest was interrupted, that is, was running, and initiate a Deferred Procedure Call (DPC), or a second level interrupt handler to signal profiler 318. In one embodiment, an interrupt is generated periodically based on some criteria, such as, policy 326. In these examples, triggering the collection of call stack information may be each time a thread within a specified process is interrupted. Of course, other events also may be used to initiate collection of the information. For example, the information may be generated periodically in response to a hardware counter overflow. Profiler 318 may generate report 322 based on the call stack information collected over some period of time.

Turning now to FIG. 4, a diagram illustrating components used in obtaining call stack information is depicted in accordance with an illustrative embodiment. In this example, data processing system 400 includes processors 402, 404, and 406. These processors are examples of processors that may be found in processor unit 300 in FIG. 3. During execution, each of these processors has threads executing on them in the depicted example. In other examples, one or more processors may be in an idle state in which no threads are executing on the processors in an idle state.

When an interrupt occurs, target thread 408 is executing on processor 402; thread 410 is executing on processor 404; and thread 412 is executing on processor 406. In these examples, target thread 408 is the thread interrupted on processor 402. For example, the execution of target thread 408 may be interrupted by a timer interrupt or hardware counter overflow, where the value of the counter is set to overflow after a specified number of events, for example, after 100,000 instructions are completed.

When an interrupt is generated, device driver 414 sends a signal to sampling threads 418, 420, and 416. Each of these sampling threads is associated with one of the processors. Sampling thread 418 is associated with processor 404, sampling thread 420 is associated with processor 406, and sampling thread 416 is associated with processor 402. These sampling threads are all woken by device driver 414 when the sampling criteria is met. In these examples, device driver 414 is similar to device driver 308 in FIG. 3.

In this example, target thread 408 is the thread of interest for which call stack information is desired. Sampling threads 418 and 420 are signaled and allowed to be active or executed without performing any work in these examples before signaling sampling thread 416. This is done to keep processors 404 and 406 busy doing some type of work before allowing the target thread 408 a chance to migrate to another processor. Sampling thread 416 is assigned work, which is a request to obtain call stack information for target thread 408. No work is assigned to sampling threads 418 and 420 because threads 410 and 412 have not yet been interrupted. Sampling threads 418 and 420 are active such that processor 404 and processor 406 do not enter an idle state.

In this manner, target thread 408 will not migrate from processor 402 to another processor because all of the processors are currently busy executing threads. By having processors 402, 404, and 406 in non-idle states, the movement of target thread 408 from processor 402 to another processor is avoided in these examples.

In these particular examples, sampling thread 416 is assigned work in the form of obtaining call stack information from virtual machine 422. Virtual machine 422 is similar to virtual machine 316 executing in operating system 304 in FIG. 3. The call stack information may be obtained by making appropriate calls to virtual machine 422. In these examples, virtual machine 422 is a Java™ virtual machine. In these examples, the interface is a Java Virtual Machine Tools Interface (JVMTI). This interface allows for the collection of call stack information. The call stacks may be, for example, standard trees containing count usage for different threads or methods. The Java virtual machine tool interface is an interface that is available in Java 5 software development kit (SDK), version 1.5.0. The Java virtual machine profiling interface (JVMPI) is available in Java 2 platform, standard edition (J2SE) SDK version 1.4.2. These two interfaces allow processes or threads to obtain information from the Java virtual machine in the form of a tool interface to the Java virtual machine. Descriptions of these interfaces are available from Sun Microsystems, Inc.

Either interface or any other interface to a Java virtual machine may be used to obtain call stack information for one or more threads. Call stack information obtained by sampling thread 416 is provided to profiler 424 for processing.

A call tree is constructed from the call stack obtained from virtual machine 422 at the time of a sample. The call tree may be constructed by monitoring method/functions entries and exits. In these examples, however, tree 500 in FIG. 5 is generated using samples obtained by a sampling thread, such as sampling thread 416 in FIG. 4.

This call tree can be stored as tree 317 in FIG. 3 or as a separate file that can be merged in by profiler 318 in FIG. 3.

Turning to FIG. 5, a diagram of a tree is depicted in accordance with an illustrative embodiment. Tree 500 is a call tree and is an example of tree 317 in FIG. 3. Tree 500 is accessed and modified by an application, such as profiler 318 in FIG. 3. In this example, tree 500 contains nodes 502, 504, 506, and 508. Node 502 represents an entry into method A, node 504 represents an entry into method B, and nodes 506 and 508 represent entries into method C and D respectively.

Turning now to FIG. 6, a diagram illustrating information in a node is depicted in accordance with an illustrative embodiment. Entry 600 is an example of information in a node, such as node 502 in FIG. 5. In this example, entry 600 contains method/function identifier 602, tree level (LV) 604, and samples 606.

The information within entry 600 is information that may be generated for a node within a tree. For example, method/function identifier 602 contains the name of the method or function. Tree level (LV) 604 identifies the tree level of the particular node within the tree. For example, with reference back to FIG. 5, if entry 600 is for node 502 in FIG. 5, tree level 604 would indicate that this node is a root node.

When the profiler is signaled, the profiler requests that a call stack be retrieved for each thread of interest. Each call stack that is retrieved is walked into a call stack tree and each sample or changes to metrics that are provided by the device driver are added to the leaf node's base metrics, which may be the count of samples of occurrences a specific call stack sequences. In other embodiments the call stack sequences may simply be recorded.

Turning now to FIG. 7, a flowchart of a process for obtaining call stack information for a target thread is depicted in accordance with an illustrative embodiment. The process illustrated in FIG. 7 may be implemented in a software component, such as device driver 414 in FIG. 4.

The process begins by detecting a monitored event (step 700). Next, a target thread is identified (step 702). The target thread is the thread that was running when the monitored event occurred.

Thereafter, a signal is sent to each sampling thread (step 704). The signal is sent to all the sampling threads in step 704 and not just the sampling thread associated with the processor on which the target thread of interest was executing when the event occurred. The signaling of all of the sampling threads is performed to ensure that none of the processors are in an idle state. By preventing processors from entering or remaining in an idle state, migration or movement of the target thread is avoided in these illustrative embodiments. Thereafter, a collection of call stack information is initiated for the target thread of interest (step 706) with the process terminating thereafter.

Figure 8:
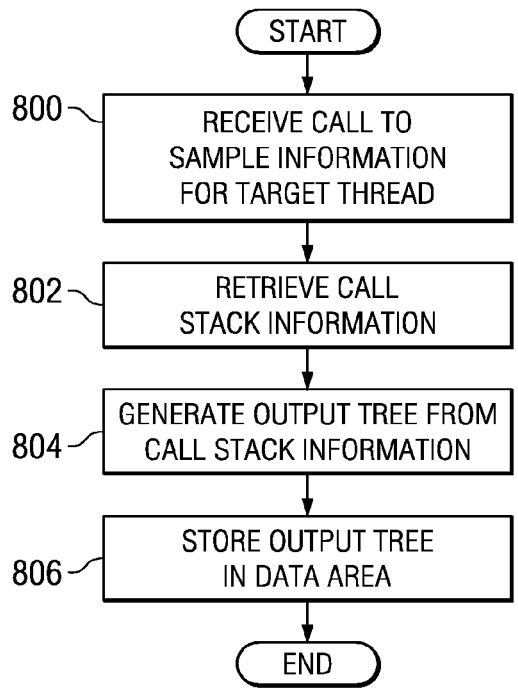
FIG. 8 is a flowchart of a process in a thread for collecting call stack information in accordance with an illustrative embodiment.

Turning next to FIG. 8, a flowchart of a process in a thread for collecting call stack information is depicted in accordance with an illustrative embodiment. The process illustrated in FIG. 8 may be implemented in a thread, such as sampling thread 416 in FIG. 4.

The process begins by receiving a notification to sample information for a target thread (step 800). Call stack information is then retrieved (step 802). Next, an output tree is generated from the call stack information (step 804). Tree 500 in FIG. 5 is an example of an output tree that may be generated by the sampling thread. Finally, the output tree is stored in a data area (step 806) with the process terminating thereafter. In these examples, the tree is stored in a data area, such as data area 314 in FIG. 3.

Figure 9:
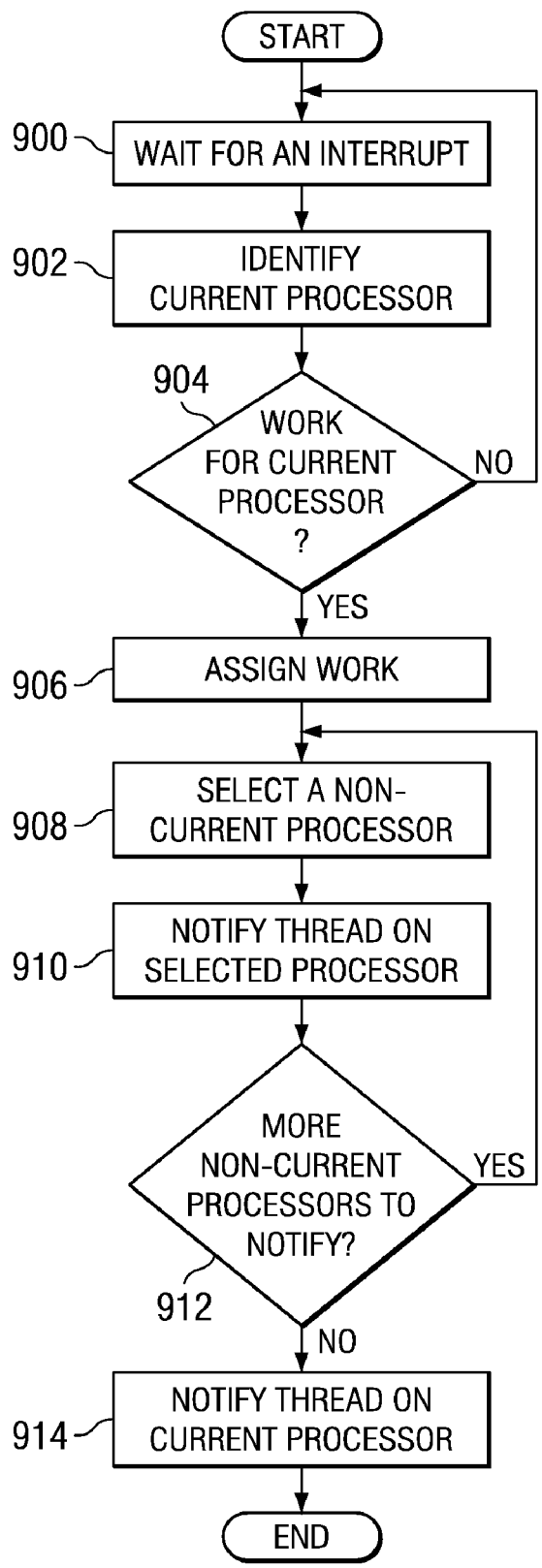
FIG. 9 is a flowchart of a process for notifying threads on processors in response to receiving an interrupt in accordance with an illustrative embodiment.

Turning now to FIG. 9, a flowchart of a process for notifying threads on processors in response to receiving an interrupt is depicted in accordance with an illustrative embodiment. The process illustrated in FIG. 9 may be implemented in a software component, such as device driver 414 in FIG. 4.

In this example, the process begins by waiting for an event in the form of an interrupt (step 900). When an interrupt occurs, a current processor is identified (step 902). In this example, the current processor is the processor on which the interrupt was received. The target thread is the thread that was executing on the current processor at the time of the interrupt. The target thread is a thread of interest for which call stack information is desired. A determination is made as to whether work is present for the current processor (step 904). Step 904 may be performed by the device driver using a policy, such as policy 326 in FIG. 3. Call stack information may not be desired every time an interrupt occurs. The "event" that triggers the collection of call stack information may be a combination of an occurrence of the interrupt and the presence of a condition. For example, call stack information may not be desired until some user state occurs, such as a specific user or type of user being logged into a data processing system. As another example, call stack information may not be desired until the user starts some process or initiates some action. If work is not present, the process returns to step 900 to wait for another interrupt.

If work is present for the current processor, the process assigns work (step 906). The work may be assigned by placing the work assignment in a work area, such as work area 311 in FIG. 3. In these examples, the work is assigned to a sampling thread that is associated with the processor on which the thread of interest was executing when the interrupt occurred. Then, a non-current processor is selected (step 908). The thread on the selected processor is notified (step 910). In step 910, a signal is sent to the thread for the selected processor to wake that thread. Thereafter, a determination is made as to whether more non-current processors are present to notify (step 912). If additional non-current processors are present for notification, the process returns to step 908. Otherwise, the thread on the current processor is notified (step 914) with the process terminating thereafter. The sampling thread for the current processor is notified last in these examples.

Figure 10:
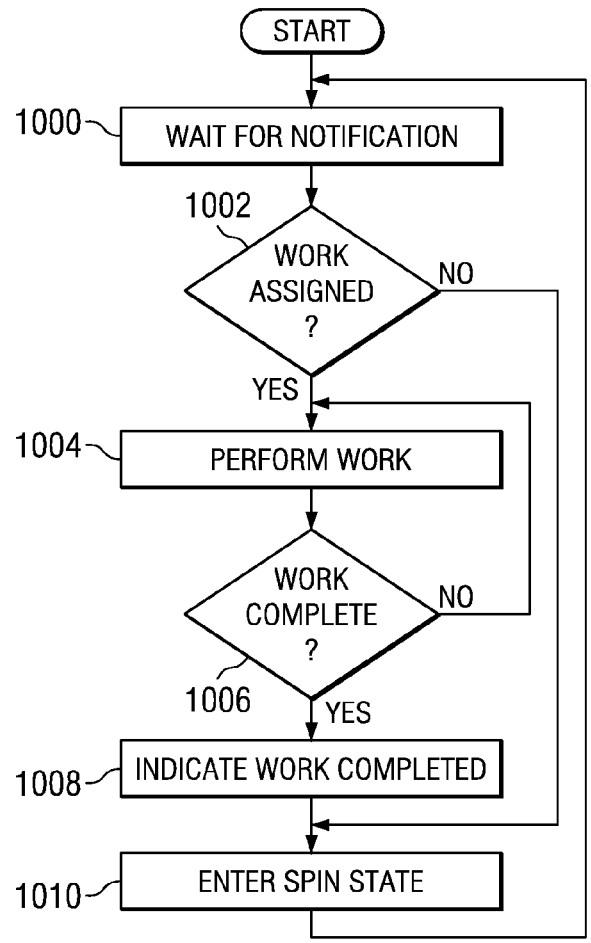
FIG. 10 is a flowchart of a process for a sampling thread in accordance with an illustrative embodiment.

Turning now to FIG. 10, a flowchart of a process for a sampling thread is depicted in accordance with an illustrative embodiment. The process illustrated in FIG. 10 may be implemented in a sampling thread, such as sampling thread 416, sampling thread 418, or sampling thread 420 in FIG. 4.

The process begins by waiting for a notification (step 1000). When a notification is received, a determination is made as to whether work has been assigned to the sampling thread (step 1002). The identification of whether work has been assigned will be made by looking at a memory location or data area, such as work area 311 in FIG. 3. For example, the work may be assigned in data area 314 in FIG. 3 to different sampling threads.

If work has not been assigned, the process continues at step 1010. On the other hand, if work has been assigned, the assigned work is performed (step 1004). In these examples, the work is to obtain call stack information for the target thread. A determination is then made as to whether the work is complete (step 1006). If the work is not complete, the process returns to step 1004. Otherwise, an indication that the work is completed is made (step 1008). This indication may be made in a work area, such as work area 311 in FIG. 3. The indication allows other sampling threads to know that the call stack information has been collected.

The process then enters a spin state (step 1010) until all work being performed is completed. When the spin state completes, the process returns to step 1000 to wait for another notification. In performing step 1010, the sampling thread may execute a spin-wait loop. This type of loop is a short code segment that reads a memory location and then compares it to a particular value. If the content of the memory location is equal to this value, then the loop completes execution. In these examples, the memory location is the work area. The indication that work has been completed by the sampling thread is the particular value needed to stop the spin state in these examples. Otherwise, the memory location is re-read and comparison is performed again. In these examples, the spin state terminates when an indication that the work has been completed occurs. This mechanism allows the sampling threads to continue to be active until the call stack information has been collected.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments provide a computer implemented method, apparatus, and computer usable program code for sampling call stack information. An event is monitored for during execution of a plurality of threads executed by a plurality of processors. In response to an occurrence of the event, a thread is identified in the plurality of threads to form an identified thread. A plurality of sampling threads is woken, wherein a sampling thread within the plurality of sampling threads is associated with each processor in the plurality of processors and wherein one sampling thread in the plurality of sampling threads obtains call stack information for the identified thread.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sampling call stack information, the computer implemented method comprising:
    monitoring for an event during execution of a plurality of threads executed by a plurality of processors;
    responsive to an occurrence of the event, identifying a thread in the plurality of threads to form an identified thread, wherein the identified thread executes on one of the plurality of processors; and
    waking a plurality of sampling threads, wherein a given sampling thread within the plurality of sampling threads is associated with a given processor in the plurality of processors and wherein one sampling thread in the plurality of sampling threads obtains call stack information for the identified thread;
    wherein a first remainder of the plurality of sampling threads are in an active state such that a second remainder of the plurality of processors remain busy, and wherein the identified thread is prevented from migrating to another of the plurality of processors.

2. The computer implemented method of claim 1, wherein the event is an interrupt and the identifying step comprises:
    identifying the thread using information available at a time of the interrupt.

3. The computer implemented method of claim 1 further comprising:
    placing the call stack information into a tree; and
    storing the tree in a memory location.

4. The computer implemented method of claim 1 further comprising:
    obtaining, by the one sampling thread, call stack information; and
    placing the first remainder of the plurality of sampling threads into a spin state.

5. The computer implemented method of claim 1, wherein the one processor is associated with a processor on the plurality of processors on which the identified thread was executing and wherein the waking step comprises:
    waking the one sampling thread that is to obtain call stack information in the plurality of sampling threads after waking the first remainder of the plurality of sampling threads.

6. The computer implemented method of claim 1, wherein each sampling thread checks a work area to determine if the each sampling thread is the one sampling thread to obtain call stack information.

7. The computer implemented method of claim 1, wherein the one sampling thread indicates when call stack information has been collected.

8. The computer implemented method of claim 1, wherein the monitoring step, the identifying step, and the waking step are performed by a device driver.

9. The computer implemented method of claim 1, wherein the event is an interrupt and a particular state in a data processing system.

10. A non-transitory computer program product comprising:
    a non-transitory computer usable medium having computer usable program code for sampling call stack information, the computer program product comprising:
    computer usable program code for monitoring for an event during execution of a plurality of threads executed by a plurality of processors;
    computer usable program code, responsive to an occurrence of the event, for identifying a thread in the plurality of threads to form an identified thread, wherein the identified thread executes on one of the plurality of processors; and
    computer usable program code for waking a plurality of sampling threads, wherein a given sampling thread within the plurality of sampling threads is associated with a given processor in the plurality of processors and wherein one sampling thread in the plurality of sampling threads obtains call stack information for the identified thread;
    wherein a first remainder of the plurality of sampling threads are in an active state such that a second remainder of the plurality of processors remain busy, and wherein the identified thread is prevented from migrating to another of the plurality of processors.

11. The non-transitory computer program product of claim 10, wherein the event is an interrupt and the computer usable program code for identifying a thread in the plurality of threads to form an identified thread comprises:
    computer usable program code for identifying the thread using information in the interrupt.

12. The non-transitory computer program product of claim 10 further comprising:
    computer usable program code for placing the call stack information into a tree; and
    computer usable program code for storing the tree in a memory location.

13. The non-transitory computer program product of claim 10 further comprising:
    computer usable program code for obtaining, by the one sampling thread, call stack information; and
    computer usable program code for placing the first remainder of the plurality of sampling threads into a spin state.

14. The non-transitory computer program product of claim 10, wherein the computer usable program code for waking comprises:
    computer usable program code for waking the one sampling thread that is to obtain call stack information in the plurality of sampling threads after waking the first remainder of the plurality of sampling threads.

15. The non-transitory computer program product of claim 10, wherein each sampling thread checks a work area to determine if the each sampling thread is the one sampling thread to obtain call stack information.

16. The non-transitory computer program product of claim 10, wherein the one sampling thread indicates when call stack information has been collected.

17. A data processing system comprising:
    a bus;
    a communications unit connected to the bus;
    a storage device connected to the bus, wherein the storage device includes computer usable program code; and
    a processor unit connected to the bus, wherein the processor unit executes the computer usable program to monitor for an event during execution of a plurality of threads executed by a plurality of processors; identify a thread in the plurality of threads to form an identified thread in response to an occurrence of the event, wherein the identified thread executes on one of the plurality of processors; and wake a plurality of sampling threads, wherein a given sampling thread within the plurality of sampling threads is associated with a given processor in the plurality of processors, wherein one sampling thread in the plurality of sampling threads obtains call stack information for the identified thread, and wherein a first remainder of the plurality of sampling threads are in an active state such that a second remainder of the plurality of processors remain busy, and wherein the identified thread is prevented from migrating to another of the plurality of processors.

18. The data processing system of claim 17, wherein the event is an interrupt and the processor executes the computer usable program code to identify the thread using information in the interrupt.

19. The data processing system of claim 17, wherein the processor unit further executes the computer usable program code to place the call stack information into a tree and store the tree in a memory location.

20. The data processing system of claim 17, wherein the processor unit further executes the computer usable program code to obtain, by the one sampling thread, call stack information and place the first remainder of the plurality of sampling threads into a spin state.

21. The data processing system of claim 17, wherein, in executing the computer usable program code to wake the plurality of sampling threads, the processor unit executes the computer usable program code to wake the one sampling thread in the plurality of sampling threads after waking the first remainder of the plurality of sampling threads.

* * * * *